United States Patent
Hu et al.

(10) Patent No.: US 11,888,732 B2
(45) Date of Patent: Jan. 30, 2024

(54) TRANSMISSION PATH FAULT PROCESSING METHOD AND APPARATUS, AND SYSTEM

(71) Applicant: HUAWEI TECHNOLOGIES CO., LTD., Guangdong (CN)

(72) Inventors: Zhibo Hu, Beijing (CN); Junda Yao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 785 days.

(21) Appl. No.: 16/997,293

(22) Filed: Aug. 19, 2020

(65) Prior Publication Data
US 2020/0382416 A1    Dec. 3, 2020

Related U.S. Application Data

(63) Continuation of application No. PCT/CN2019/091512, filed on Jun. 17, 2019.

(30) Foreign Application Priority Data

Jun. 30, 2018  (CN) .......................... 201810703774.9

(51) Int. Cl.
| | |
|---|---|
| *H04L 45/28* | (2022.01) |
| *H04L 45/50* | (2022.01) |
| *H04L 45/00* | (2022.01) |
| *H04L 45/748* | (2022.01) |

(52) U.S. Cl.
CPC ............ *H04L 45/507* (2013.01); *H04L 45/22* (2013.01); *H04L 45/28* (2013.01); *H04L 45/748* (2013.01)

(58) Field of Classification Search
CPC ..... H04L 45/122; H04L 45/748; H04L 45/28; H04L 45/00; H04L 45/50
See application file for complete search history.

(56) References Cited

U.S. PATENT DOCUMENTS

| | | | | |
|---|---|---|---|---|
| 7,463,591 | B1* | 12/2008 | Kompella | ........... H04L 43/0811 |
| | | | | 370/248 |
| 7,940,695 | B1* | 5/2011 | Bahadur | ................. H04L 47/10 |
| | | | | 370/254 |

(Continued)

FOREIGN PATENT DOCUMENTS

| | | |
|---|---|---|
| CN | 101588520 A | 11/2009 |
| CN | 105637535 A | 6/2016 |

(Continued)

OTHER PUBLICATIONS

V. S. Chava et al, Impairment and Regenerator Aware Lightpath SetupUsing Distributed Reachability Graphs, 2011, 6 pages.

(Continued)

*Primary Examiner* — Hassan A Phillips
*Assistant Examiner* — Prenell P Jones
(74) *Attorney, Agent, or Firm* — WOMBLE BOND DICKINSON (US) LLP

(57) ABSTRACT

This application discloses a transmission path fault processing method and apparatus, and a system, to resolve a problem that a packet fails to be forwarded because a previous-hop node of a faulty node cannot process a stitching label. The method includes: receiving, by a first network device, a stitching label and a stitching label stack list corresponding to the stitching label that are sent by a stitching network device; determining, in a process of sending a packet through a primary path, that the stitching network device is faulty, where the packet includes a label stack list, and the stitching network device is a next-hop network device of the first network device; and replacing, by the first network device, the stitching label in the label stack list with the stitching label stack list, and switching, based on the updated label stack list, the packet to a backup path for sending.

13 Claims, 8 Drawing Sheets

(56) References Cited

U.S. PATENT DOCUMENTS

| | | | |
|---|---|---|---|
| 2002/0016803 A1* | 2/2002 | Ryan | G06F 3/1275 |
| | | | 715/255 |
| 2002/0018235 A1* | 2/2002 | Ryan | G06Q 10/06 |
| | | | 358/1.18 |
| 2003/0112749 A1 | 6/2003 | Hassink et al. | |
| 2004/0028064 A1* | 2/2004 | Cetin | H04L 12/4633 |
| | | | 370/409 |
| 2005/0041636 A1 | 2/2005 | Iselt et al. | |
| 2011/0280123 A1 | 11/2011 | Wijnands et al. | |
| 2015/0103691 A1* | 4/2015 | Bhattacharya | H04L 41/0803 |
| | | | 370/254 |
| 2015/0195178 A1* | 7/2015 | Bhattacharya | H04L 41/342 |
| | | | 718/1 |
| 2015/0256456 A1 | 9/2015 | Previdi et al. | |
| 2017/0149692 A1* | 5/2017 | Allan | H04L 45/18 |
| 2018/0026880 A1 | 1/2018 | Nainar et al. | |
| 2018/0316596 A1* | 11/2018 | Chen | H04L 12/4633 |

FOREIGN PATENT DOCUMENTS

| | | |
|---|---|---|
| CN | 105704019 A | 6/2016 |
| CN | 105763448 A | 7/2016 |
| CN | 105871721 A | 8/2016 |
| CN | 105871722 A | 8/2016 |
| CN | 107547371 A | 1/2018 |
| CN | 107547389 A | 1/2018 |
| CN | 107666438 A | 2/2018 |
| CN | 108023815 A | 5/2018 |
| CN | 108141410 A | 6/2018 |
| EP | 3226475 A1 | 10/2017 |
| JP | 2005260321 A | 9/2005 |
| JP | 2006033307 A | 2/2006 |
| JP | 2007074311 A | 3/2007 |
| JP | 2013504976 A | 2/2013 |
| WO | 2009054032 A1 | 4/2009 |
| WO | 2017118880 A1 | 7/2017 |

OTHER PUBLICATIONS

Ii gen et al,software defined content centric network''s segment routing strategy, Jul. 2017, 5 pages.

S. Hegde:"Node Protection for SR-TE Pathsdraft-hegde-spring-node-protection-for-sr-te-paths-02",Oct. 30, 2017, total 7 pages.

S.Previdi, Ed. et al., "draft-ietf-isis-segment-routing-extensions-18", IS-IS Extensions for Segment Routing,total 35 pages.

* cited by examiner

TRANSMISSION PATH FAULT PROCESSING METHOD AND APPARATUS, AND SYSTEM

CROSS-REFERENCE TO RELATED APPLICATIONS

This application is a continuation of International Application No. PCT/CN2019/091512, filed on Jun. 17, 2019, which claims priority to Chinese Patent Application No. 201810703774.9, filed on Jun. 30, 2018. The disclosures of the aforementioned applications are herein incorporated by reference in their entireties.

TECHNICAL FIELD

This application relates to the field of communications technologies, and in particular, to a transmission path fault processing method and apparatus, and a system.

BACKGROUND

Segment routing-traffic engineering (SR-TE) is a new multiprotocol label switching (MPLS) TE tunneling technology in which the interior gateway protocol (IGP) or the border gateway protocol (BGP) is used as control signaling. A controller is responsible for calculating a forwarding path for a tunnel and delivering a label stack strictly mapped to the path to a forwarder. On a start node of the SR-TE tunnel, the forwarder can control a packet transmission path on a network based on the label stack.

When a node on a primary path is faulty, currently, a packet is forwarded through a backup path based on a fast reroute (FRR) technology.

If the faulty node is a stitching node, and a label stack carries a stitching label of the stitching node, when a previous-hop node of the stitching node determines that the stitching node is faulty, the previous-hop node needs to determine a backup path that bypasses the stitching node. However, the previous-hop node cannot process the stitching label, resulting in a packet forwarding failure.

SUMMARY

This application provides a transmission path fault processing method and apparatus, and a system, to resolve a prior-art problem that a packet fails to be forwarded because a previous-hop node of a faulty node cannot process a stitching label.

According to a first aspect, an embodiment of this application provides a transmission path fault processing method, including: receiving, by a first network device, a stitching label and a stitching label stack list corresponding to the stitching label that are sent by a stitching network device; determining, by the first network device in a process of sending a packet through a primary path, that the stitching network device is faulty, where the packet includes a label stack list used to guide packet forwarding on the primary path, and the stitching network device is a next-hop network device of the first network device on the primary path; and replacing, by the first network device, the stitching label in the label stack list with the stitching label stack list, and switching, based on an updated label stack list, the packet to a backup path for sending.

In the solution provided in this embodiment of this application, the stitching network device advertises the stitching label and the stitching label stack across an entire network, so that after learning of the stitching label and the stitching label stack, the previous-hop network device of the stitching network device replaces the stitching label in the label stack list with the stitching label stack list, and switches, based on the updated label stack list, the packet to the backup path for sending. This avoids a data packet forwarding failure caused because the previous-hop network device cannot switch the packet to the backup path due to inability to process the stitching label.

With reference to the first aspect, in a possible implementation of the first aspect, after the receiving, by a first network device, a stitching label and a stitching label stack list corresponding to the stitching label that are sent by a stitching network device, the method further includes: storing, by the first network device, the stitching label and the corresponding stitching label stack list in a label information table generated by the first network device for the stitching network device; and the replacing, by the first network device, the stitching label in the label stack list with the stitching label stack list, and switching the updated packet to a backup path for sending includes: obtaining, by the first network device, a first label from a stack top of the label stack list, wherein the first label is used to indicate that a next-hop network device forwarding the packet is the stitching network device; determining, by the first network device based on a backup forwarding table, a first forwarding action corresponding to the first label, wherein the backup forwarding table is used to indicate the backup path, and the first forwarding action is used to indicate to look up the label information table; determining, by the first network device based on the label information table, a second label located at the stack top of the stitching label stack list, wherein the second label is used to indicate that a next-hop network device of the stitching network device on the primary path is a third network device; using, by the first network device, the second label as an inner label, and determining, from the backup forwarding table, an outer label of a backup path from the first network device to the third network device; and sending, by the first network device, the packet to a next-hop network device of the first network device on the backup path based on the outer label.

According to the foregoing design, the stitching label and the corresponding stitching label stack list are stored in the label information table generated by the first network device for the stitching network device. This facilitates searching and saves time.

With reference to the first aspect, in a possible implementation of the first aspect—the receiving, by a first network device, a stitching label and a stitching label stack list corresponding to the stitching label that are sent by a stitching network device includes: receiving, by the first network device, type length value TLV sent by the stitching network device, where the TLV includes the stitching label and the stitching label stack list corresponding to the stitching label.

With reference to the first aspect, in a possible implementation of the first aspect, the TLV is a label binding SID/label binding TLV.

With reference to the first aspect, in a possible implementation of the first aspect, the method further includes: after receiving a node segment identifier of the third network device flooded by the stitching network device across a network, flooding, by the first network device, the node segment identifier of the third network device to another network device on the network.

When there is a loose path on a forwarding path, when a destination network device (the stitching network device) of the loose path segment is faulty, information that the network device is faulty is flooded across the entire network, and all network devices on the entire network delete primary and backup forwarding tables corresponding to the stitching network device. When there is the loose path, the primary and backup paths from an ingress network device to an egress network device need to pass through the loose path segment, bypass the stitching network device from the previous-hop network device of the stitching network device, and go to the egress network device. After deleting the primary and backup forwarding tables of the stitching network device, a source network device of the path segment cannot forward the data packet to the previous-hop network device of the stitching network device, resulting in a packet forwarding failure. Therefore, according to the foregoing design, after receiving a node segment identifier of the destination network device of the loose path segment, the previous-hop network device of the destination network device of the loose path segment floods the node segment identifier of the destination network device across the entire network. Therefore, the source network device of the loose path segment can determine a forwarding path based on the node segment identifier of the destination network device, and forward the data packet.

With reference to the first aspect, in a possible implementation of the first aspect—the method further includes: when the first network device sends the packet through the backup path, receiving, by the first network device, indication information sent by the stitching network device after fault recovery, where the indication information is used to indicate that the stitching network device cannot correctly forward the packet, and continuing, by the first network device, to send the packet through the backup path.

When the stitching node on the primary path is faulty, the network device switches the packet to the backup path for forwarding. After the stitching network device is recovered and restarted, the node that recovers from a fault floods information of the node such as a node (prefix) label and an adjacency label to another node on the network again. After receiving the information flooded by the node that recovers from a fault, the network device switches the data packet to the primary path, in other words, transmits the packet again through the node that recovers from a fault. However, because the stitching node that recovers from the fault is just restarted, the stitching node may have an incomplete local database, for example, has not learned of information about other nodes, such as a node label and an adjacency label of the next-hop node of the stitching node on the primary path. In this case, after receiving the packet, the stitching network device cannot forward the packet to the next hop node, resulting in a packet loss. Based on this, according to the foregoing design, after the stitching network device is recovered, the stitching network device preferably sends the indication information, to indicate, to the previous-hop network device, that the recovered stitching network device cannot correctly forward the packet. Therefore, the previous-hop network device forwards the data packet still through the backup path.

According to a second aspect, an embodiment of this application provides a transmission path fault processing method, including: receiving, by a stitching network device, a stitching label and a stitching label stack list corresponding to the stitching label that are sent by a controller; and flooding, by the stitching network device to another network device on a network, the stitching label and the stitching label stack list corresponding to the stitching label.

In the solution provided in this embodiment of this application, the stitching network device advertises the stitching label and the stitching label stack across an entire network, so that after learning of the stitching label and the stitching label stack, a previous-hop network device of the stitching network device replaces the stitching label in a label stack list with the stitching label stack list, and further switches, based on an updated label stack list, a packet to a backup path for sending. This avoids a data packet forwarding failure caused because the previous-hop network device cannot switch to the backup path due to inability to process the stitching label.

According to a third aspect, based on a same inventive concept as the method embodiment of the first aspect, an embodiment of this application provides a transmission path fault processing apparatus. The apparatus is applied to the first network device in the first aspect, in other words, the apparatus may be the first network device, or may be a chip that can be applied to the first network device. The apparatus has a function of implementing each embodiment of the first aspect. The function may be implemented by hardware, or may be implemented by hardware executing corresponding software. The hardware or the software includes one or more modules corresponding to the foregoing functions.

According to a fourth aspect, based on a same inventive concept as the method embodiment of the second aspect, an embodiment of this application provides a transmission path fault processing apparatus. The apparatus is applied to the network device in the second aspect, in other words, the apparatus may be the network device, or may be a chip that can be applied to the network device. The apparatus has a function of implementing each embodiment of the second aspect. The function may be implemented by hardware, or may be implemented by hardware executing corresponding software. The hardware or the software includes one or more modules corresponding to the foregoing functions.

According to a fifth aspect, an embodiment of this application provides a transmission path fault processing apparatus, including a processor and a memory. The memory is configured to store an instruction. When the apparatus runs, the processor executes the instruction stored in the memory, so that the apparatus performs the transmission path fault processing method in any one of the first aspect or the implementations of the first aspect. It should be noted that the memory may be integrated into the processor, or may be independent of the processor. The apparatus may further include a bus. The processor is coupled to the memory by using the bus. The memory may include a read-only memory and a random access memory. When the apparatus needs to run, a basic input/output system cured in the read-only memory or a bootloader system in an embedded system is used for startup, so that the apparatus enters a normal running state. After entering the normal running state, the apparatus runs an application program and an operating system in the random access memory, so that the processor performs the method in any one of the first aspect or the possible implementation designs of the first aspect.

According to a sixth aspect, an embodiment of this application provides a transmission path fault processing apparatus, including a processor and a memory. The memory is configured to store an instruction. When the apparatus runs, the processor executes the instruction stored in the memory, so that the apparatus performs the transmission path fault processing method in any one of the second aspect or the implementations of the second aspect. It should be noted that the memory may be integrated into the processor, or may be independent of the processor. The apparatus may further include a bus. The processor is coupled to the memory by using the bus. The memory may include a read-only memory and a random access memory. When the apparatus needs to run, a basic input/output system cured in the read-only memory or a bootloader system in an embedded system is used for startup, so that the apparatus enters a normal running state. After entering the normal running state, the apparatus runs an application program and an operating system in the random access memory, so that the processor performs the method in any one of the second aspect or the possible implementation designs of the second aspect.

According to a seventh aspect, an embodiment of this application further provides a system, including the apparatus according to the third aspect or the fifth aspect and the apparatus according to the fourth aspect or the sixth aspect. With reference to the seventh aspect, in a possible implementation of the seventh aspect, the system may further include another network device that interacts with the two the network devices in the solution provided in the embodiments of this application, for example, another network device on a transmission path.

According to an eighth aspect, an embodiment of this application further provides a readable storage medium. The readable storage medium stores a program or an instruction, and when the program or the instruction is run on a computer, the transmission path fault processing method in any one of the foregoing aspects is performed.

According to a ninth aspect, an embodiment of this application further provides a computer program product including an instruction. When the instruction is run on a computer, the computer is enabled to perform the transmission path fault processing methods according to the foregoing aspects.

In addition, for technical effects brought by any design manner in the third to the ninth aspects, refer to technical effects brought by different implementations in the first aspect to the second aspect. Details are not described herein.

DESCRIPTION OF EMBODIMENTS

Figure 1A:
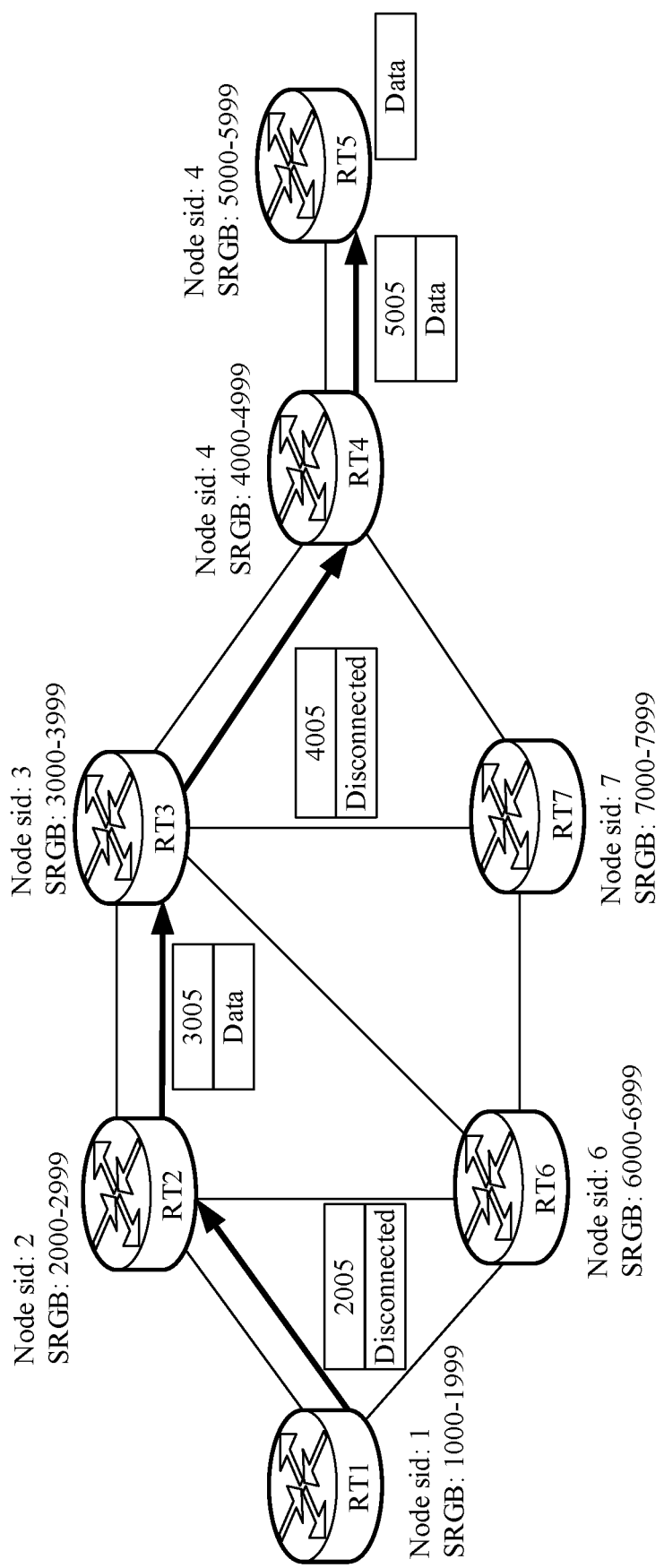
FIG. 1A is a schematic diagram of a network architecture according to an embodiment of this application.

This application is applied to a node that supports SR-TE. In the embodiments of this application, a node may alternatively be referred to as a network device. The network device is a device that provides a routing and forwarding function on a network, for example, may be a router, a switch, a forwarder, or a label switching router (LSR). This is not limited. In a subsequent description process, the node is used as an example for description.

In an SR-TE technology, a control plane uses the link-state IGP protocol or the border gateway protocol (BGP) to distribute MPLS labels of nodes, and a data plane forwards an MPLS packet based on the labels distributed by the control plane.

The SR-TE (Segment Routing-Traffic Engineering) is a new TE tunneling technology in which the interior gateway protocol (IGP) or the border gateway protocol (BGP) is used as control signaling. A controller is responsible for calculating a forwarding path of a tunnel and delivering, to a forwarder, a label stack list strictly mapped to the path. On an ingress node of an SR-TE tunnel, the forwarder can control a packet transmission path on a network based on the label stack list.

The following first explains and describes terms in the embodiments of this application.
(1) A segment routing global block (SRGB) is a user-specified label set reserved for a segment.
(2) A segment is identified by a segment label (Segment ID, SID). The segment label in the embodiments of this application may be referred to as a segment identifier. An SID may be mapped to an MPLS label on a forwarding plane.

Segments are classified into a prefix segment, an adjacency segment, and a node segment.

The prefix segment is used to identify a destination address prefix (Prefix) on an SR network. The prefix segment may be flooded to other network elements by using the IGP protocol. The prefix segment is globally visible and valid. The prefix segment is marked by a prefix segment identifier (Prefix Segment ID, Prefix SID). In the embodiments of this application, a prefix segment label is referred to as a prefix label for short. The prefix SID is an offset within an SRGB range advertised by a destination node. A receive end calculates an actual label based on an SRGB of the receive end.

The adjacency segment is used to identify a routing link between two adjacent nodes on a network. The adjacency segment can be flooded to other network elements by using the IGP protocol. The adjacency segment is globally visible and locally valid. The adjacency segment is marked by an adjacency segment label (Adjacency Segment ID, Adjacency SID). In the embodiments of this application, the adjacency segment label is referred to as an adjacency label for short.

The adjacency label is directional and is used to guide packet forwarding. For example, an adjacency label 9003 corresponds to a link PE1→P3. The adjacency SID is a local SID beyond an SRGB range.

The node segment is a special prefix segment used to identify a specific node. An IP address is configured as a prefix on a local loopback interface of a node. A prefix SID of the node is actually a node segment label (Node SID). In the embodiments of this application, the node segment label may be referred to as a node label for short.

In brief, the prefix segment represents a destination address, and the adjacency segment represents an outbound link of a data packet. The destination address and the outbound link may be respectively similar to a destination IP address and an outbound interface in conventional IP forwarding. In an IGP area, a node floods a node SID and an adjacency SID of the node by using the extended IGP protocol. In this way, any node can obtain information about another node.

Any path on the network may be constructed by combining and ordering a prefix (node) SID and an adjacency SID. A path on the network may include a plurality of route segments. The constructed path is represented by a label stack list. The label stack list includes a segment label (Segment ID) corresponding to each route segment on a forwarding path.

A destination node advertises a node (prefix) SID of the destination node by using the IGP protocol. A forwarding node parses the node SID and calculates a label value based on a local SRGB. Each node then uses the IGP protocol to collect topology information, calculates a label forwarding path according to a shortest path first algorithm, and delivers a calculated next hop and an outer label (OuterLabel) to a forwarding table, to guide data packet forwarding.

(3) Stitching node and stitching label

If a depth of a label stack list exceeds a depth of a label stack list supported by a forwarder, one label stack list cannot carry all segment labels on a path. A controller needs to allocate a plurality of label stack lists to the forwarder. The controller delivers a label stack list on an appropriate node and also allocates a special label on the appropriate node, and then associates these label stack lists, to implement segment-based forwarding. The special label is referred to as a stitching label, and the appropriate node is referred to as a stitching node. The controller allocates the stitching label to the stitching node and pushes the stitching label on a stack bottom of the label stack list. When a packet is forwarded to the stitching node, the controller replaces the stitching label with a new label stack list based on an association relationship between a stitching label and a label stack list, to continue guiding in next-segment forwarding. It should be noted that, for ease of description, the label stack list in the embodiments of this application is referred to as a label stack, and a label stack corresponding to the stitching label is referred to as a stitching label stack.

In addition, it should be noted that "a plurality of" in the embodiments of this application means two or more. The term "and/or" describes an association relationship for describing associated objects and represents that three relationships may exist. For example, A and/or B may represent the following three cases: Only A exists, both A and B exist, and only B exists. In addition, it should be understood that in the description of this application, terms such as "first" and "second" are merely used for distinction description, and shall not be understood as an indication or implication of relative importance or an indication or implication of an order. The node 1, the node 2, or the like is also merely used to distinguish between described nodes, and cannot be understood as an indication or implication of relative importance, and cannot be understood as an indication or implication of a sequence.

In addition, a forwarding table in the embodiments of this application may usually include only a primary forwarding table, or may include a primary forwarding table and a backup forwarding table. Primary and backup forwarding tables in the embodiments of this application include a primary forwarding table and a backup forwarding table.

FIG. 1A is used as an example to describe establishment of a prefix segment path and forwarding of a data packet on a prefix segment.

For example, a to-be-established prefix segment path is RT1→RT2→RT3→RT4→RT5. The RT1 is a first node of the prefix segment and the RT5 is a destination node of the prefix segment.

An SRGB=[5000-5999] is set on the RT5 and a prefix (node) SID is set to 5 on a loopback interface of the RT5. The RT5 generates and delivers a forwarding entry based on the SRGB and the prefix (node) SID. Then, the RT5 encapsulates the SRGB and the prefix SID into a control packet and floods the control packet across an entire network by using the IGP. After receiving the control packet, another network device on the network parses the prefix SID advertised by the RT5, calculates an inner label value based on an SRGB of the another network device, calculates an outer label value (OuterLabel) based on an SRGB advertised by a next-hop node, calculates a label forwarding path through an IGP topology, and then generates a forwarding entry corresponding to the inner label value.

The RT4 parses the prefix SID advertised by the RT5 and calculates a label value based on an SRGB=[4000-4999] of the RT4. A calculation formula is as follows: inner label inLabel=start value of an SRGB+prefix SID. Therefore, inLabel=4000+5=4005. The outer label (OuterLabel) is calculated through an IS-IS topology. A calculation formula is as follows: OuterLabel=start value of an SRGB advertised by a next-hop device+prefix SID value (namely, a node label of the destination node on the prefix segment or the node segment). As shown in FIG. 1A, a next hop of the RT4 is the RT5, and a range of the SRGB advertised by the RT5 is [5000-5999]. Therefore, OuterLabel=5000+5=5005.

A calculation process for the RT3 is similar to that for the RT4: inLabel=3000+5=3005, and OuterLabel=4000+5=4005. A calculation process for the RT2 is similar to that for the RT4: inLabel=2000+5=2005, and OuterLabel=3000+5=3005. A calculation process for the RT1 is similar to that for the RT4: inLabel=1000+5=1005, and OuterLabel=2000+5=2005.

After the segment path from the RT1 to the RT5 is established, the node RT1 adds a label value 2005 to a received data packet and forwards the data packet. The node RT2 receives the data packet carrying the label, performs label switching, pops the label 2005 out, and replaces the label with an outer label 3005. The node RT3 receives the packet, performs label switching, pops the label 3005 out, and replaces the label with a label 4005. After receiving the data packet, the node RT4 pops the label 4005 out and replaces the label 4005 with a label 5005. After receiving the data packet, the node RT5 pops the label 5005 out and continues to look up a route and forward it.

Figure 1B:
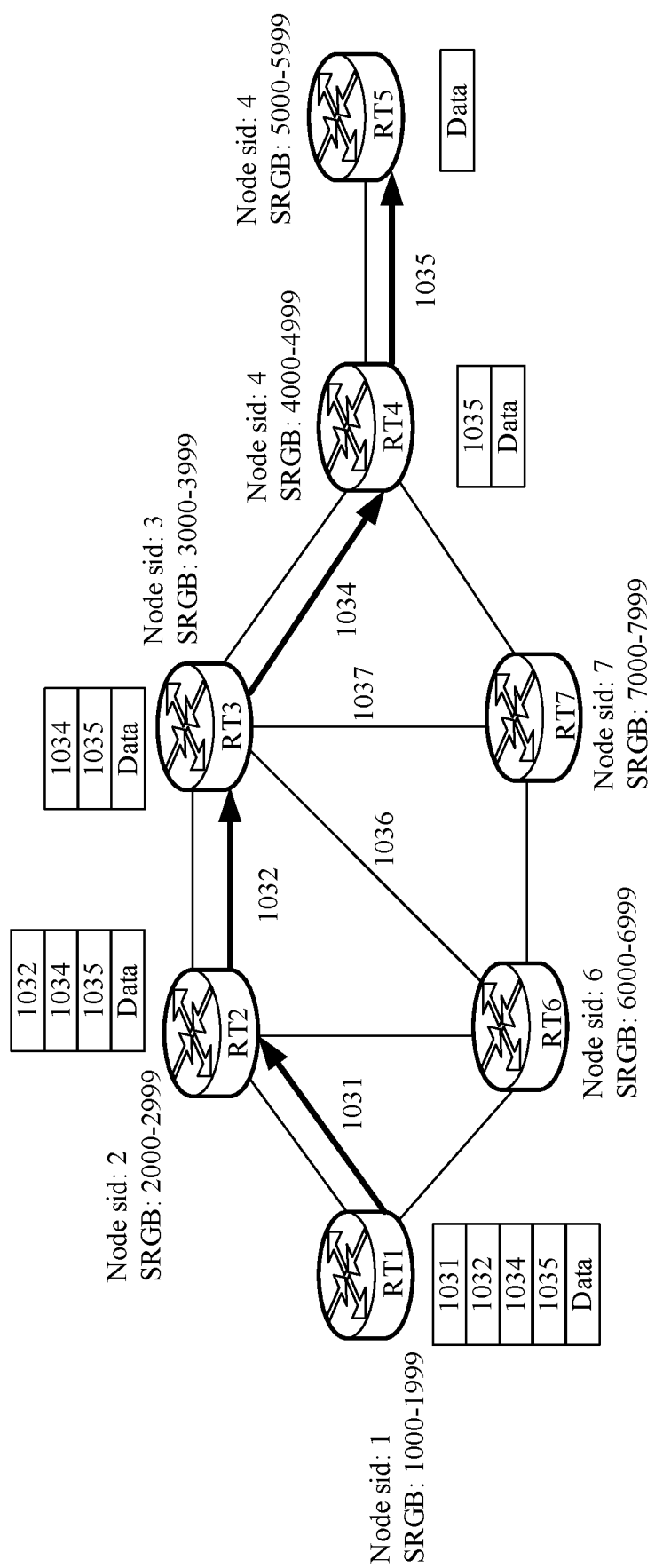
FIG. 1B is a schematic diagram of another network architecture according to an embodiment of this application.

The following uses FIG. 1B as an example to describe establishment of a strict segment path (establishment of a path bypassing a node is not allowed) and forwarding of a data packet on the strict segment path.

The forwarder allocates adjacency labels based on the IGP protocol and reports the allocated adjacency labels to a controller, so that the controller generates a label stack list based on the adjacency labels.

The adjacency labels are flooded across the entire network by using the IGP protocol. As shown in FIG. 1B, a node RT1 is used as an example. A specific process of allocating the adjacency labels by using the IGP protocol is as follows.

The RT1 applies for local dynamic labels for all links of the RT1 by using the IGP protocol (for example, the RT1 allocates an adjacency label 1031 to a link RT1→RT2). The RT1 advertises adjacency labels and floods the adjacency labels across the entire network by using the IGP protocol. Another device on the network learns, by using the IGP protocol, of the adjacency labels advertised by the RT1. Specifically, another node allocates and advertises adjacency labels in a manner of the RT1, and floods the adjacency labels to another device on the network.

The controller calculates a path based on constraint attributes of an SR-TE tunnel, to obtain the path through calculation. The controller combines adjacency labels on the entire path based on a topology and the adjacency labels to generate a label stack list. For example, as shown in FIG. 1B, the controller obtains, through calculation, a path of the SR-TE tunnel: RT1→RT2→RT3→RT4→RT5, and the corresponding label stack list {1031, 1032, 1034, 1035}. The controller delivers the label stack list obtained through calculation to the ingress node RT1 of the forwarder. The forwarder therefore obtains the SR-TE tunnel based on the label stack list delivered by the controller. The label stack list herein in this application may alternatively include node labels. In other words, the label stack list is {1002, 2003, 3004, 4005}.

The forwarder performs an operation on a label of a packet based on the label stack list corresponding to the SR-TE tunnel, and searches for a forwarding outbound interface based on a topmost label hop by hop, to guide the data packet to be forwarded to a destination address of the tunnel.

When the packet enters the SR-TE tunnel, the ingress node adds a label stack list to the packet. When the packet is forwarded through the SR-TE tunnel, after the forwarding outbound interface is found based on the topmost label, the ingress node pops the topmost label out. For example, as shown in FIG. 1B, the ingress node RT1 adds the label stack list {1031, 1032, 1034, 1035} to the data packet, and then performs link matching based on the topmost label 1031, finds that a corresponding forwarding outbound interface is a link RT1→RT2, and then pops the label 1031 out. The packet carries a label stack {1032, 1034, 1035} and is forwarded to the next-hop node RT2 through the link RT1→RT2. After receiving the packet, the intermediate node RT2 performs link matching based on the topmost label 1032, finds that a corresponding forwarding outbound interface is a link RT2→RT3, and then pops the label 1032 out. By analogy, after receiving the packet, the node RT3 continuously forwards the packet in the same manner as the RT2. The node RT4 pops the last label 1035 out, and then forwards the data packet to the node RT5. The egress node RT5 receives a packet carrying no label and continues to forward the packet through routing table lookup.

In a strict segment path mode, when an equivalent path exists, load cannot be balanced, either. In this case, a cross-node node label may be specified based on a node label or a hybrid label stack formed by a node label and an adjacency label. The controller sends the label stack to a first node of the forwarder, and the forwarder searches for an outbound interface hop by hop based on the label stack to pop a label out, and guide the data packet to be forwarded to the destination address of the tunnel. For example, as shown in FIG. 1A, it is specified that the path from the RT1 to the RT5 needs to pass through the nodes RT3 and RT4. In this case, a loose path is formed between the RT1 and the RT3, and the data packet may be forwarded by the RT2 or RT6. In this case, the label stack list used for packet forwarding on the RT1 is {2003, 3004, 4005}.

A link fault or a node fault may occur during SR-TE packet forwarding. Currently, an FRR mechanism can be used to recover a path. For example, the node RT2 is a faulty node.

When the node RT2 is not faulty, a forwarding path identified by an SR-TE label stack is: RT1→RT2→RT3→RT4→RT5. When the node RT2 is faulty, the neighboring node RT1 of the node RT2 replaces the node RT2 to perform a label popping (POP) action, uses a next-layer label as a destination address, and forwards the data packet through a path, serving as a backup path, that bypasses the faulty node RT2. The backup path is RT1→RT6→RT3→RT4→RT5.

For example, the label stack list used by the RT1 to send the data packet is {1002, 2003, 3004, 4005}. The RT1 may check the topmost label 1002 of the label stack, to determine that the node RT2 is a faulty node, and then check the topmost label 1002 and the second label 2003 of the label stack, to determine that a node after the faulty node on the path is the RT3. The RT1 obtains, through calculation, a path, that bypasses the faulty node RT2, to the node (namely, the RT3) identified by the second label 2003, and uses the path as an SR-TE FRR node protection path for the next-hop node RT2.

Before the RT2 is faulty, each node calculates a backup forwarding table and a label information table (Context table) by using the IGP in advance. Each node generates a context table and primary and backup forwarding tables for a neighboring node. The context table includes a quantity of neighbors x (node (prefix) labels of all nodes on the entire network+all adjacency labels advertised by neighboring nodes). Each neighboring node corresponds to a context entry. For example, the node RT1 generates context entries corresponding to the neighboring node RT2 for the RT2, the context entries include the corresponding node (prefix) label information of all the nodes on the entire network and adjacency labels advertised by the RT2. The node (prefix) label information of each of all the nodes on the entire network is the sum of a node label of the node and a start value of an SRGB of the node RT2. When there is a faulty node on a path, a previous-hop node of the faulty node determines a backup path by using a context table and primary and backup forwarding tables, and forwards a data packet through the backup path.

It should be noted that when a node on a primary path or a path from a node to a next hop is faulty, after a previous-hop node of the node on the primary path perceives the fault, the previous-hop node floods information that the node is faulty to another node on the network.

If the faulty node is a stitching node, and the label stack carries a stitching label of the stitching node, when a previous-hop node of the stitching node determines that the stitching node is faulty, the previous-hop node needs to determine a backup path that bypasses the stitching label. However, only the stitching node learns of the stitching label stack corresponding to the stitching label, and the previous-hop node does not learn of the stitching label stack. Therefore, the previous-hop node cannot process the stitching label.

Figure 2:
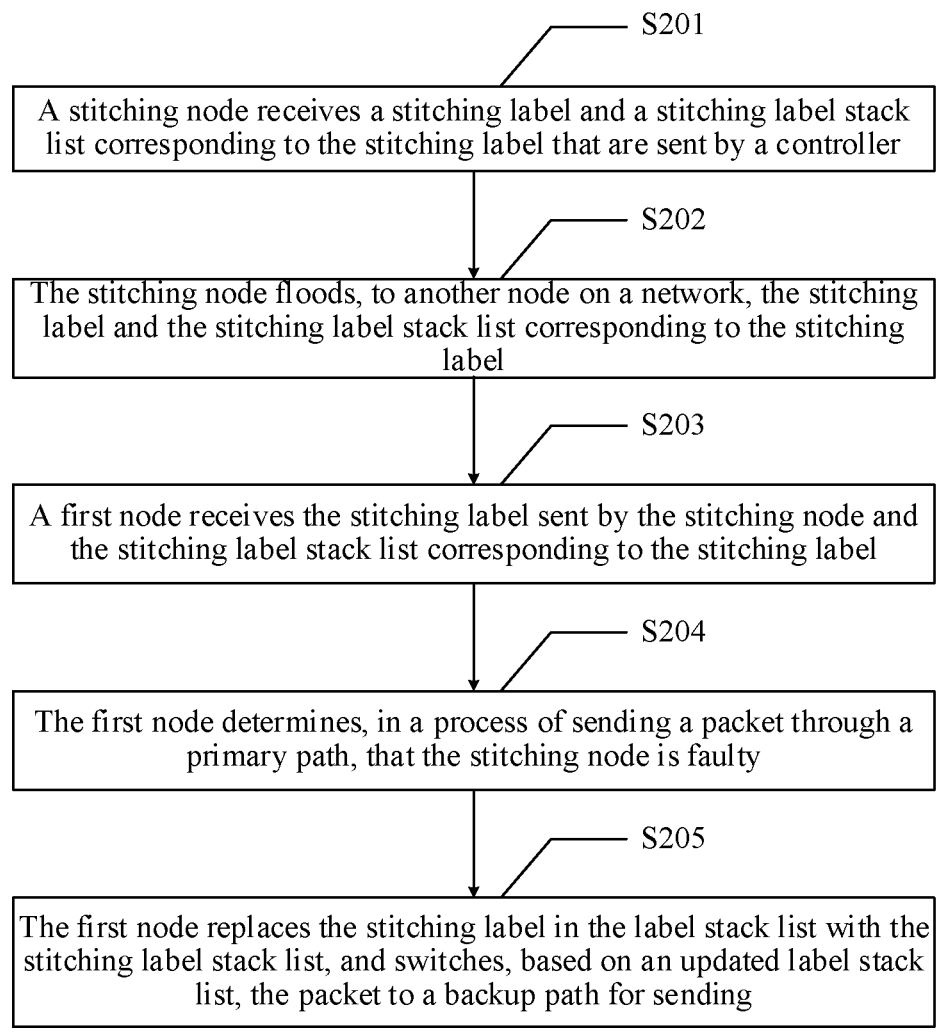
FIG. 2 is a flowchart of a transmission path fault processing method according to an embodiment of this application.

Based on this, an embodiment of this application provides a transmission path fault processing method. Referring to FIG. 2, the method includes the following operations:

S201. A stitching node receives a stitching label and a stitching label stack list corresponding to the stitching label that are sent by a controller.

S202. The stitching node floods, to another node on a network, the stitching label and the stitching label stack list corresponding to the stitching label.

S203. A first node receives the stitching label and the stitching label stack list corresponding to the stitching label that are sent by the stitching node.

S204. The first node determines, in a process of sending a packet through a primary path, that the stitching node is faulty, where the packet includes a label stack list used to guide packet forwarding on the primary path, and the stitching node is a next-hop node of the first node on the primary path.

S205. The first node replaces the stitching label in the label stack list with the stitching label stack list, and switches, based on an updated label stack list, the packet to a backup path for sending.

In one embodiment, after the first node receives the stitching label and the stitching label stack list corresponding to the stitching label that are sent by the stitching node, the first node stores the stitching label and the corresponding stitching label stack list in a label information table generated by the first node for the stitching node.

That the first node replaces the stitching label in the label stack list with the stitching label stack list, and switches an updated packet to a backup path for sending may be implemented in the following manner:

obtaining, by the first node, a first label from a stack top of the label stack list, where the first label is used to indicate that a next-hop node forwarding the packet is the stitching node; determining, by the first node based on a backup forwarding table, a first forwarding action corresponding to the first label, where the backup forwarding table is used to indicate the backup path, and the first forwarding action is used to indicate to look up the label information table; determining, by the first node based on the label information table, a second label located at the stack top of the stitching label stack list, where the second label is used to indicate that the next-hop node of the stitching node on the primary path is a third node; using, by the first node, the second label as an inner label, and determining, from the backup forwarding table, an outer label of a backup path from the first node to the third node; and sending, by the first node, the packet to a next-hop node of the first node on the backup path based on the outer label.

Optionally, the first node receives the stitching label and the stitching label stack list corresponding to the stitching label that are sent by the stitching node includes: receiving, by the first node, type length value TLV sent by the stitching node, where the TLV includes the stitching label and the stitching label stack list corresponding to the stitching label. For example, the TLV may be a label binding SID/label binding TLV.

Optionally, the method further includes: after receiving a node segment identifier of the third node flooded by the stitching node across the network, when determining that the stitching node is faulty, flooding, by the first node, the node segment identifier of the third node to another node on the network.

Optionally, the method further includes: when the first node sends the packet through the backup path, receiving, by the first node, indication information sent by the stitching node after fault recovery, where the indication information is used to indicate that the stitching node is unable to correctly forward the packet, and continuing, by the first network device, to send the packet through the backup path.

Figure 3:
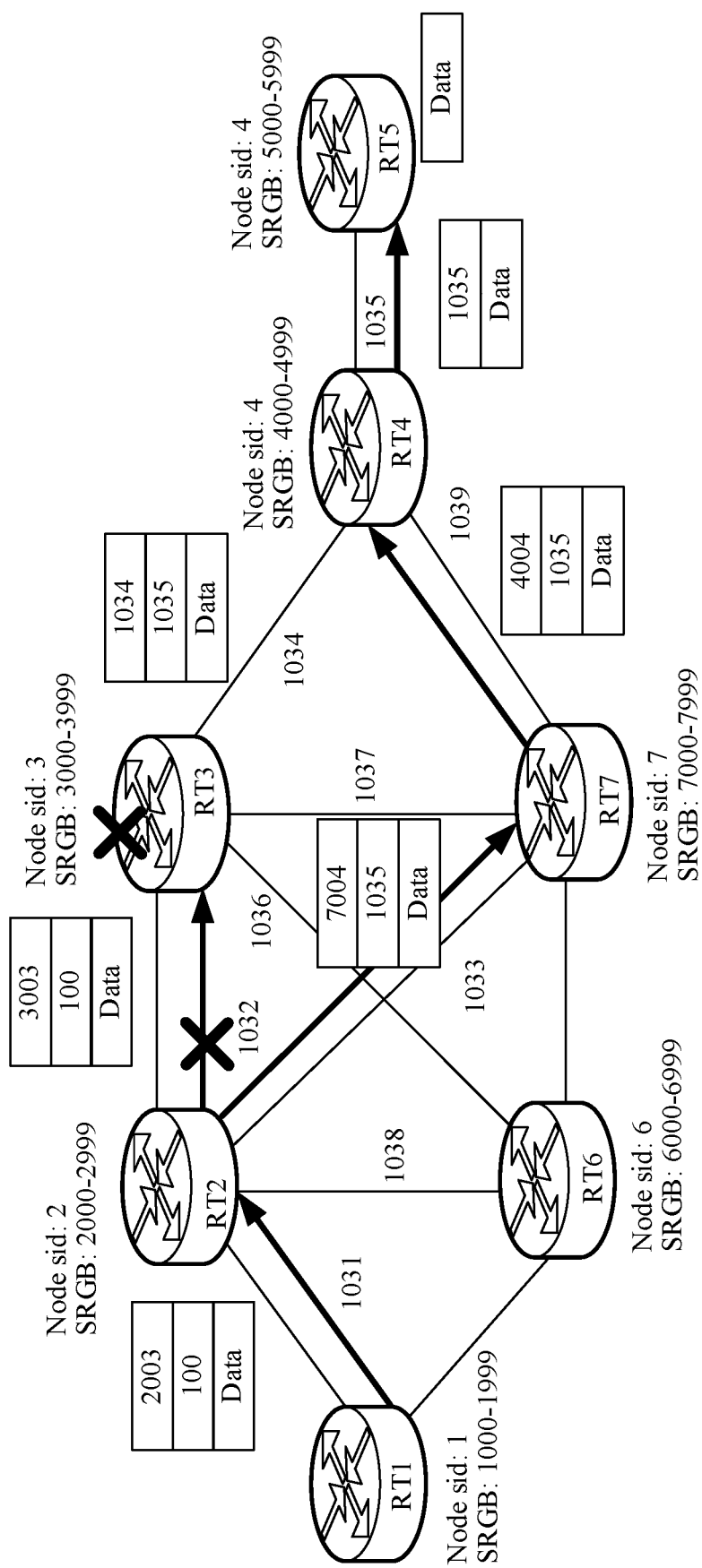
FIG. 3 is a flowchart of a transmission path fault processing method according to an embodiment of this application.

In an example of a network architecture shown in FIG. 3, a process of establishing a path including a stitching node and a process of forwarding a data packet are first described in detail. In the network architecture shown in FIG. 3, RT2 may be the first node in the embodiment shown in FIG. 2, and RT3 may be the stitching node in the embodiment shown in FIG. 2.

A controller calculates a transmission path based on constraint attributes of an SR-TE tunnel. The path may be a strict path or a loose path. The controller integrates adjacency labels (and/or node labels) on the transmission path based on a topology and the adjacency labels (and/or the node labels) to generate a label stack, and sends the label stack to the first node of the transmission path. When a depth of the label stack exceeds a depth of a label stack supported by a forwarder, one label stack cannot carry all the adjacency labels (and/or the node labels), and the controller needs to group the adjacency labels on the entire path into a plurality of label stacks for carrying. In this embodiment of this application, a stitching label stack may include adjacency labels, or certainly may include node labels.

As shown in FIG. 3, an example in which the stitching label stack include adjacency labels is used. For example, as shown in FIG. 3, it is specified that a path from RT1 to RT5 needs to pass through nodes RT3 and RT4. In this case, a loose path is formed between the RT1 and the RT3, and a data packet may be forwarded by the RT2 or RT6. For example, the controller obtains, through calculation, an SR-TE tunnel path: RT1→RT3→RT4→RT5, and two corresponding label stacks: {1003, 100} and {1034, 1035}. 100 is a stitching label, and 1034 and 1035 are adjacency labels. 1003 is obtained by calculation based on a node label of the RT3 and a start value of an SRGB of the RT1.

The controller delivers the label stacks to corresponding forwarders. For example, the controller allocates a stitching label, and delivers the stitching label and a stitching label stack {100: 1034, 1035} corresponding to the stitching label to the stitching node RT3. The controller uses the stitching label 100 as a stack bottom of a label stack on the RT1. The controller delivers the label stack {1003, 100} to the first node RT1.

In this embodiment of this application, the RT1 determines a primary path: RT1→RT2→RT3→RT4→RT5 through path calculation.

The RT1 determines that the primary path passes through the RT2, and therefore replaces an outer label (a topmost label) 1003 of the label stack included in the data packet with 2003 (node label of the RT3+start value of an SRGB of the RT2), and sends an updated data packet to the RT2. When the stitching node is not faulty, the RT2 replaces the topmost label with 3003 and sends an updated packet to the RT3 after receiving the packet from the RT1. The RT3 pops the topmost label out and replaces the topmost label 100 in an updated label stack list with {1034, 1035}. The RT3 determines, based on the topmost label 1034, that the next-hop node is the RT4, and after popping the topmost label 1034 out, the RT3 forwards an updated data packet to the RT4. The RT4 determines, based on a topmost label 1035, that a next-hop node is the RT5, and therefore pops the topmost label 1035 out, and sends an updated data packet to the RT5.

When the stitching node RT3 is faulty, the previous-hop node RT2 cannot process the stitching label in the label stack, resulting in a data packet forwarding failure.

Based on this, this embodiment of this application provides a transmission path fault processing solution. When receiving the stitching label and the stitching label stack corresponding to the stitching label that are sent by the controller, the stitching node advertises the stitching label and the stitching label stack corresponding to the stitching label to the entire network.

For example, the stitching label and the stitching label stack may be included in a binding TLV and advertised across the entire network. The stitching node RT3 uses the binding TLV to advertise the stitching label (Binding Sid) and the corresponding stitching label stack {100: 1034, 1045}. Several SID/label sub TLVs can be added to an existing binding TLV, to fill with a specific stitching label and a stitching label stack corresponding to the stitching label. For a specific format of the binding TLV, refer to FIG. 4.

In an example, after receiving the stitching label and the stitching label stack corresponding to the stitching label that are advertised by the RT3, the RT2 may store the stitching label and the stitching label stack corresponding to the stitching label in a context table. For partial content of context entries corresponding to the RT3 in the context table, refer to Table 1.

Inlabel indicates an inner label and is the sum of a start value of an SRGB of a current node and a node SID of a neighboring node, to be specific, the sum of the start value 2000 of the SRGB of the RT2 and the node label 3 of the RT3 is 2003. The inner label is used as a key value field for looking up the context table.

In Table 1, local SIDs include adjacency labels (Adj Sid) and the stitching label that are advertised by the RT3.

An Adj SID represents an adjacency label advertised by a neighboring node. The adjacency labels advertised by the RT3 are an adjacency label 1034 of a link between the RT3 and the RT4, an adjacency label 1037 of a link between the RT3 and RT7, and an adjacency label 1036 of a link between the RT3 and the RT6.

An Adj node SID represents a destination node corresponding to an adjacency label advertised by a neighboring node, and is the sum of a start value of an SRGB of the current node and a node SID advertised by the destination node. For example, if the adjacency label of the link between the RT3 and the RT4 is 1034 and the destination node is the RT4, an Adj node SID corresponding to 1034 is the sum of the initial value of the SRGB of the RT2 and a node label of the RT4, and is 2004.

An action represents a forwarding action corresponding to a local SID or an Adj node SID.

TABLE 1

| Inlabel | Local SID (Adj SID or Binding SID) | Action | Adj node SID |
|---|---|---|---|
| 2003 | 1034 | Fwd to RT4 | 2004 |
|  | 1037 | Fwd to RT7 | 2007 |
|  | 1036 | Fwd to RT6 | 2006 |
|  | 100 | Replacing with {1034, 1035} |  |

In the network architecture shown in FIG. 3, it is specified that the path from the RT1 to the RT5 needs to be pass through the nodes RT3 and RT4. In this case, a loose path is formed between the RT1 and the RT3, and a packet may be forwarded by the RT2 or the RT6. In this embodiment of this application, the RT1 determines the primary path: RT1→RT2→RT3→RT4→RT5 through path calculation. In this case, a label stack received by the RT1 from the controller is {1003, 100}. For example, when the RT3 is faulty, a backup path is RT1→RT2→RT7→RT4→RT5. In addition, the RT2 generates primary and backup forwarding tables of node SIDS on the entire network. For partial content of the primary and backup forwarding tables, refer to Table 2. FIG. 2 shows only partial content of two entries corresponding to inner labels 2003 and 2004.

TABLE 2

| Inlabel | Action | Outlabel | TYPE |
|---|---|---|---|
| 2003 | Fwd to RT3 | 3003 | Primary |
|  | Pop, and look up the context table |  | Backup |
| 2004 | Fwd to RT3 | 3004 | Primary |
|  | Fwd to RT7 | 7004 | Backup |

The RT1 determines that a next-hop node of the RT1 is the RT2, so that the RT1 replaces a topmost label 1003 of the label stack with 2003, adds the label stack to the data packet, and sends the data packet to the RT2. After receiving the data packet from the RT1, the RT2 determines, based on the topmost label 2003 of the label stack of the data packet, that the next-hop node RT3 indicated by the topmost label is faulty, and the RT2 needs to find a forwarding path to the next-hop node RT4 of the RT3 that bypasses the RT3. Therefore, the RT2 looks up the backup forwarding table (Table 2), to find a forwarding entry corresponding to the inner label 2003, and looks up a context table generated by the RT2 for the neighboring node RT3. A forwarding action indicated in the forwarding entry is to pop the topmost label 2003 out. After popping the topmost label 2003 out, the RT2 determines that a topmost label in a label stack list is a stitching label. The RT2 searches local SIDs in the context table based on the stitching label 100 and finds a forwarding entry corresponding to the inner label 2003. A forwarding action indicated in this entry is to replace with {3004, 4005}. The RT2 then replaces the stitching label 100 with {1034, 1035}. The RT2 obtains an adjacency label 1034 which is from the RT3 to the RT4, continues to search local SID records in the context table based on the topmost label 1034, finds that a forwarding action is to forward to the RT4, and determines that an adj node label corresponding to the RT4 is 2004. In other words, the inner label, on the RT2, of the route segment from the ingress node RT2 to the egress node RT4 is obtained. The node RT2 replaces 1034 with 2004 and looks up the primary forwarding table by using 2004 as an inner label, to find that a next-hop node is the RT3. Because an interface to the RT3 is faulty, the RT2 switches the data packet to the backup path and looks up the backup forwarding table, to find, by using 2004 as an inner label, that a forwarding action is to forward to the RT7, and an outer label is 7004, so that the node RT2 replaces the topmost label with the found outer label, to be specific, pops the topmost label 2004 out, and replaces 2004 with 7004. A label stack herein is {7004, 1035}. The RT2 forwards an updated data packet to the RT7.

After receiving the data packet, the RT7 determines, based on the topmost label 7004, that a next-hop node is the RT4, to replace the topmost label 7004 with 4004, and forwards an updated data packet to the RT4. Similarly, after receiving the data packet, the RT4 determines that the destination node indicated by the topmost label is the RT4, pops the topmost label out, determines that a next-hop node indicated by a topmost label 1035 of an updated label stack is the RT5, and sends an updated data packet to the RT5.

In the solution provided in this embodiment of this application, the stitching node advertises the stitching label and the stitching label stack across the entire network, so that after learning of the stitching label and the stitching label stack, the previous-hop node of the stitching node replaces the stitching label in the label stack list with the stitching label stack list, and further switches, based on the updated label stack list, the packet to the backup path for sending. This avoids a data packet forwarding failure caused because the previous-hop node cannot switch the data packet to the backup path due to inability to process the stitching label.

In addition, the context table is generated in advance. In an SR-TE FRR solution, a node generates a context table for each neighbor of the node. Therefore, specifications of the context table are the sum of a quantity of nodes on the entire network and a quantity of neighbors of the neighboring node. Therefore, each node needs to generate a context table with specifications of a quantity of neighbors x (a quantity of nodes on the entire network+a quantity of neighbors of the neighboring node).

When there are a large quantity of nodes on the network, and specifications of context tables supported by some nodes each are insufficient to support the quantity of neighbors x (a quantity of nodes on the entire network+a quantity of neighbors of neighboring nodes), content of the context tables generated by these nodes is incomplete. When a node is faulty on the network, a packet may fail to be switched to a correct backup path.

Based on this, this embodiment of this application provides a context table configuration manner. When obtaining, by using the IGP, an adjacency label and a node label of a node adjacent to the neighboring node that are advertised by a neighboring node, after learning of an SRGB of the neighboring node, the node generates a context table. The context table includes the adjacency label advertised by the neighboring node, node label information of the node adjacent to the neighboring node, and a difference between an initial value of an SRGB of the current node and a start value of an SRGB of the neighboring node. The node label information herein is an offset between the initial value of the SRGB of the neighboring node and the node label of the node adjacent to the neighboring node.

Figure 5:
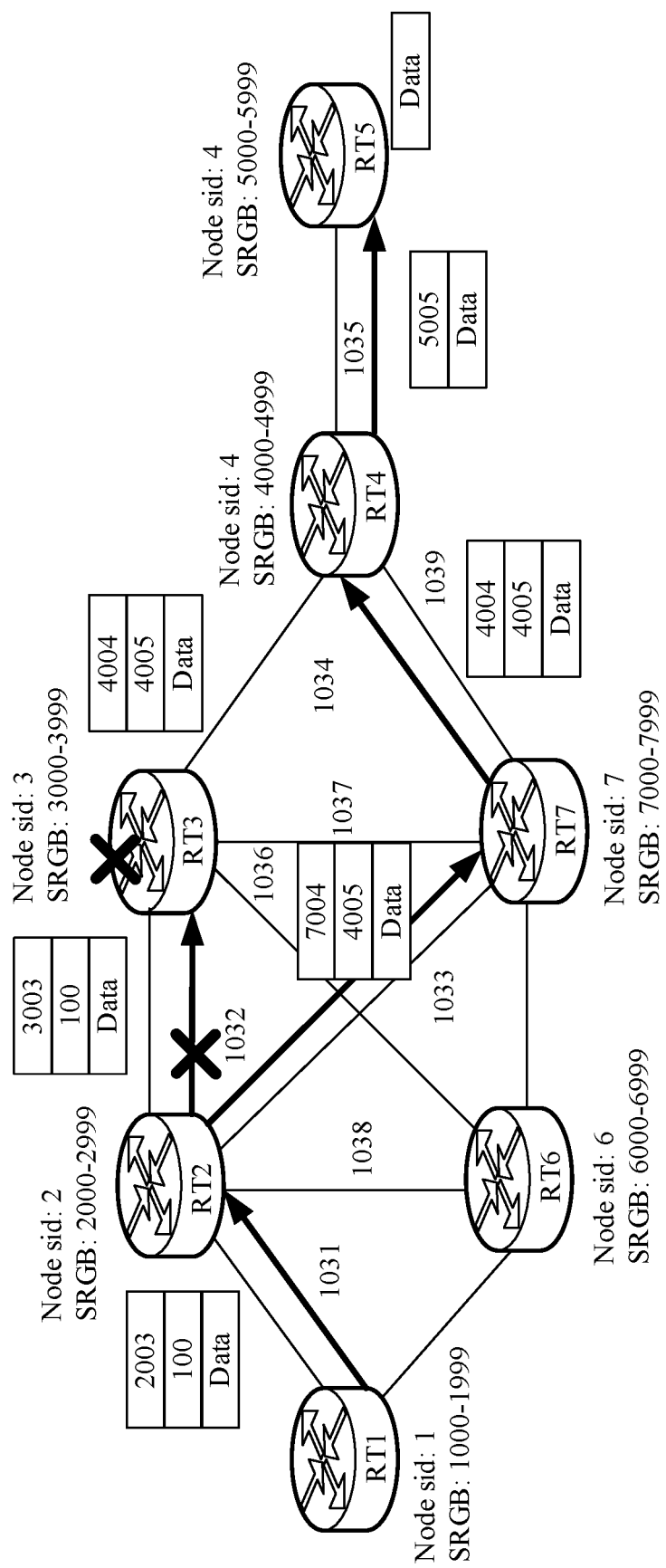
FIG. 5 is a flowchart of another transmission path fault processing method according to an embodiment of this application.

In an example of FIG. 5, a context table generated by RT2 for a neighboring node RT3 is shown in Table 3. Nodes adjacent to the RT3 include the RT2, RT7, RT6, and RT4. A start value of an SRGB of the RT2 is 2000, and a start value of an SRGB of the neighboring node RT3 of the RT2 is 3000. Therefore, a difference between the start value of the SRGB of the RT2 and the start value of the SRGB of the RT3 is −1000. In this embodiment, an example in which the stitching label stack includes node labels is used for description. The RT3 is a stitching node. The stitching label and the stitching label stack corresponding to the stitching label are {100: 3004, 4005}.

In an example, after receiving the stitching label and the stitching label stack corresponding to the stitching label that are advertised by the RT3, the RT2 may store the stitching label and the stitching label stack corresponding to the stitching label in entries corresponding to the node RT3 in the context table. For partial content of the context table, refer to Table 3. Table 3 shows partial content of entries corresponding to the RT3 in the context table, to be specific, partial content of an entry corresponding to the inner label 2003. In Table 3, an SRGB difference is equal to the start value of the SRGB of the current node minus the start value of the SRGB the neighboring node.

TABLE 3

| Inlabel | SRGB difference | Local SID (Adj SID or binding SID) | Action | Adj node SID |
|---|---|---|---|---|
| 2003 | −1000 | 1034 | Fwd to RT4 | 2004 |
| | | 1037 | Fwd to RT7 | 2007 |
| | | 1036 | Fwd to RT6 | 2006 |

TABLE 3-continued

| Inlabel | SRGB difference | Local SID (Adj SID or binding SID) | Action | Adj node SID |
|---|---|---|---|---|
| | | 100 | Replacing with {3004, 4005} | |

Figure 4:
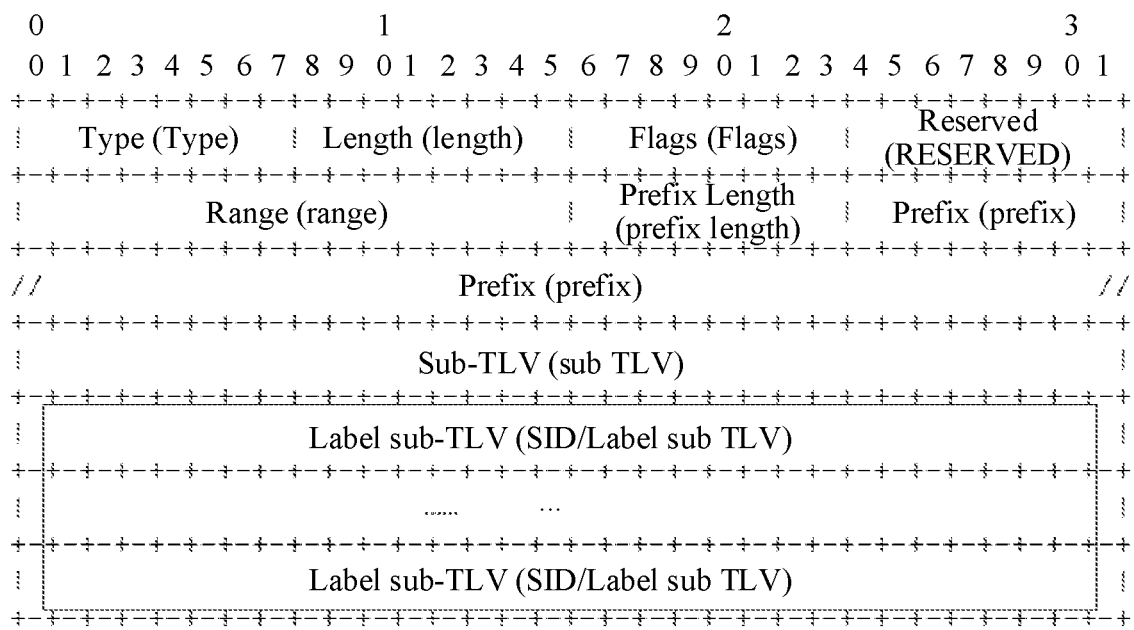
FIG. 4 is a schematic diagram of a format of a binding TLV according to an embodiment of this application.

The following uses FIG. 4 as an example to describe in detail a data packet forwarding process.

In FIG. 4, it is specified that the path from the ingress node RT1 to the egress node RT5 needs to pass through the nodes RT3 and RT4. In this case, a loose path is formed between the RT1 and the RT3, and a packet may be forwarded by the RT2 or the RT6. In this embodiment of this application, the RT1 determines the primary path: RT1→RT2→RT3→RT4→RT5 through path calculation. A label stack list used for packet forwarding on the RT1 is {1003, 100}. For example, when the RT3 is faulty, a backup path is RT1→RT2→RT7→RT4→RT5. In addition, the RT2 generates primary and backup forwarding tables of node SIDs on the entire network. For partial content of the primary and backup forwarding tables, refer to Table 4. Table. 4 shows only partial content of two entries corresponding to inner labels 2003 and 2004.

TABLE 4

| Inlabel | Action | Outlabel | TYPE |
|---|---|---|---|
| 2003 | Fwd to (forward to) RT3 | 3003 | Primary |
| | Pop, and look up the context table | | Backup |
| 2004 | Fwd to (forward to) RT3 | 3004 | Primary |
| | Fwd to (forward to) RT7 | 7004 | Backup |

When the RT3 is not faulty, as shown in FIG. 5, when the RT1 determines that the next-hop node of the RT1 is the RT2, the RT1 replaces the topmost label 1003 of the label stack with a label 2003 indicating the RT2, and then adds the label stack to the data packet for sending to the RT2. The RT2 receives the data packet sent by the RT1, and a label stack in the data packet is {2003, 100}. The RT2 looks up the primary forwarding table based on the topmost label in the label stack, for example, looks up Table 4 by using the topmost label 2003 as inlabel, to find a forwarding action is to forward to the RT3, so that the RT2 replaces the topmost label with 3003, to be specific, replaces the topmost label with a label value determined based on a start value of an SRGB of a next-hop node (the start value of the SRGB of the RT3) and a node label of a destination node (the node label of the RT3), and then forwards an updated data packet to the RT3. The RT3 receives the data packet sent by the RT2, and a label stack in the data packet is {3003, 100}. Then, the RT3 determines that a receiving node indicated by the topmost label is the RT3. Therefore, after popping the topmost label 3003 out, the RT3 replaces the topmost label 100 with the stitching label stack list {3004, 4005}, replaces the topmost label 3004 with 4004, determines that a next-hop node is the RT4, and forwards an updated data packet to the RT4. Similarly, the RT4 receives the data packet sent by the RT3, and a label stack in the data packet is {4004, 4005}. Then, the RT4 determines that a receiving node indicated by the topmost label is the RT4. Therefore, the RT4 pops the topmost label out, and determines, based on the topmost label 4005, that a next-hop node is the RT5. Therefore, the RT4 replaces the topmost label with 5005, and forwards an updated data packet to the RT5. The RT5 receives the data packet sent by the RT4, and a label stack in the data packet is {5005}. Then the RT5 determines that a receiving node indicated by the topmost label is the RT5. Therefore, the RT5 pops the topmost label out, and continues to look up a forwarding table for further forwarding.

When the stitching node RT3 is faulty, after the RT2 receives the data packet from the RT1, the RT2 determines, based on the topmost label 2003 of the label stack of the data packet, that the next-hop node RT3 indicated by the topmost label is faulty, the RT2 needs to find a forwarding path from the RT3 to the next-hop node RT4 of the RT3 that bypasses the RT3. Therefore, the RT2 looks up the backup forwarding table (Table 3), to find that the forwarding action corresponding to the inner label 2003 in the backup forwarding table is popping the topmost label 2003 out, and looks up the context table generated by the RT2 for the neighboring node RT3. After popping the topmost label 2003 out, the RT2 determines that the topmost label in the label stack list is a stitching label, and replaces the stitching label 100 with {3004, 4005} based on the context table. The SRGB difference obtained based on the context table in Table 3 is −1000. The RT2 obtains a label which is from the RT3 to the next-hop node RT4, namely, the topmost label 3004, and calculates the sum of the topmost label and the SRGB difference, to be specific, the label (3004)+the SRGB difference (−1000)=2004. To be specific, the inner label, on the RT2, of a route segment from the ingress node RT2 to the egress node RT4 is obtained. The node RT2 looks up the primary forwarding table by using 2004 as an inner label, to find that a next-hop node is the RT3. Because an interface to the RT3 is faulty, the RT2 switches the data packet to the backup path and looks up the backup forwarding table, to find, by using 2004 as an inner label, that a forwarding action is to forward to the RT7, and an outer label is 7004, so that the node RT2 replaces the topmost label with the found outer label, to be specific, pops the topmost label 3004 out and replaces 3004 with 7004. A label stack herein is {7004, 4005}. The RT2 forwards an updated data packet to the RT7.

After receiving the data packet, the RT7 determines, based on the topmost label 7004, that a next-hop node is the RT4, therefore replaces the topmost label 7004 with 4004, and forwards an updated data packet to the RT4. Similarly, after receiving the data packet, the RT4 determines that the destination node indicated by the topmost label is the RT4, pops the topmost label out, determines that a next-hop node indicated by a topmost label 4005 of an updated label stack is the RT5, replaces the topmost label 4005 with 5005, and sends an updated data packet to the RT5.

In the prior art, when a node on a primary path is faulty, a previous-hop node of the faulty node generates a context table and primary and backup forwarding tables for the faulty node. When switching a packet from the primary path to a backup path, the previous-hop node looks up the backup forwarding table based on a topmost label in a label stack, to determine a forwarding action in the backup forwarding table is to look up the context table, and then determines, based on the context table, a next-hop node that needs to forward the packet on the backup path. In other words, in the prior art, the backup forwarding table is looked up only once, and the backup path is determined by using the context table. However, in the solution provided in this embodiment of this application, when an SRGB difference is delivered to a forwarding plane node, and when the node label of the next-hop node of the faulty node is determined only by using the context table, to determine the next-hop node that forwards the packet on the backup path, the backup forwarding table is looked up again based on a node label of the next-hop node of the faulty node. Therefore, the context table does not need to include node labels corresponding to all nodes, and only needs to include label information corresponding to a node adjacent to a neighboring node, thereby avoiding a packet forwarding failure caused by insufficient entry capacity, and also saving storage resources.

When there is a loose path on a forwarding path, a destination node of the loose path is a stitching node. When the destination node (stitching node) of the loose path segment is faulty, information that the node is faulty is flooded across the entire network, and all nodes on the entire network delete primary and backup forwarding tables corresponding to the faulty node. When there is the loose path, both a primary path and a backup path from an ingress node to an egress node needs to pass through the loose path segment, needs to bypass the faulty node from a previous-hop node of the faulty node, and goes to the egress node. After deleting the primary and backup forwarding tables corresponding to the faulty node, a source node of the path segment cannot forward a data packet to a previous-hop node of the faulty node, resulting in a packet forwarding failure.

In an example of FIG. 5, the RT1 specifies that an SR-TE path passes through the RT3, the RT4, and the eRT5. When the RT3 is faulty, and the RT2 detects that the RT3 is faulty, the RT2 floods (Flooding), by using the IGP, fault information that the RT3 is faulty, triggers SR-TE FRR switching to switch a packet to a backup path: RT7→RT4→RT5 that bypasses the faulty node RT3. When the fault information that the RT3 is faulty is flooded to all nodes on the network, the RT1 starts to converge and deletes the primary and backup forwarding tables corresponding to the RT3. Consequently, the RT1 cannot forward the data packet to the RT2.

Based on this, this embodiment of this application provides the transmission path fault processing method. When the previous-hop node of the stitching node detects that the stitching node is faulty, the previous-hop node floods a prefix (node) label of the stitching node to all nodes on the entire network by using the IGP. When flooding the prefix label of the stitching node, the previous-hop node may carry the prefix label of the stitching node in a mapping TLV (Tag (Type)-Length-Value).

It should be noted that, for details of the mapping TLV in this embodiment of this application, refer to the document draft-ietf-isis-segment-routing-extensions released by the International Internet Engineering Task Force (Internet Engineering Task Force, IETF). A part related to the mapping TLV in this document is incorporated into this specification through introduction like copying as a whole. For brevity, details are not described herein.

Figure 6:
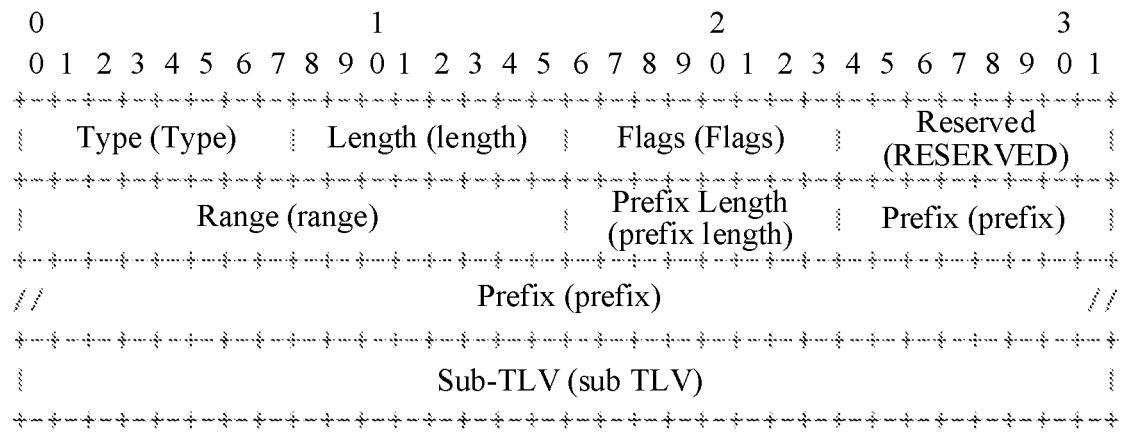
FIG. 6 is a schematic diagram of a format of a mapping TLV according to an embodiment of this application.

A TLV definition includes three fields: a label field (Type), a length field (Length), and a value field (Value). The value field includes the prefix label of the stitching node. The mapping TLV may alternatively be referred to as a label binding TLV (SID/Label Binding TLV). For example, a mapping TLV format shown in FIG. 6 is used as an example. A type field represents a type of the TLV, a length field represents a length of a control packet, a flags field represents flags, and a RESERVED field represents a reserved bit that is not used currently. A range field provides an ability to specify a range of addresses and associated prefix SIDs. A prefix length field represents a length of a prefix. A prefix field represents a forwarding equivalence class on a tail node of an advertised path. A sub-TLV field represents sub-TLVs used to carry the prefix SIDs in the mapping TLV.

For example, in this embodiment of this application, the previous-hop node may add an R flag to the flags field, to represent a re-advertisement flag. To be specific, the R flag indicates that the prefix label of the faulty node is re-advertised by the previous-hop node to other nodes on the entire network.

Figure 7:
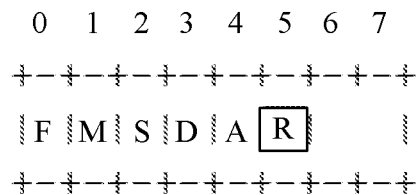
FIG. 7 is a schematic diagram of a format of flags according to an embodiment of this application.

For formats of flags, refer to FIG. 7. An F flag represents an address family flag. If the F flag is unset, an IPv4 prefix is indicated. If the F flag is set, an IPv6 prefix is indicated. An M flag represents a mirror context flag. If an advertised SID corresponds to a mirrored context, this flag is set. An S flag indicates whether the SID/label binding TLV can be flooded across an entire routing domain. If the S flag is set, the SID/label binding TLV is flooded across the entire routing domain. If the S flag is unset, the SID/label binding TLV cannot be leaked between levels. D flag: The flag needs to be set when the SID/label binding TLV is leaked from level-2 to level-1. Otherwise, this flag needs to be clear. An A flag indicates an attached flag. A level is the concept of a network layer in the intermediate system-to-intermediate system (IS-IS) routing protocol. A common area is referred to as the level-1, and a backbone area is referred to as the level-2.

The network architecture shown in FIG. 5 is used as an example. When determining that the stitching node RT3 is faulty, the RT2 floods the node label of the RT3 across the entire network. After receiving the node label of the RT3 flooded by the RT2, the RT1 determines, based on the node label of the stitching node RT3, an outer label of the data packet to be sent to the RT2 node. To be specific, outer label=start value of an SRGB of the RT2+node label of the RT3=2000+3=2003. After receiving the data packet, the RT2 switches the data packet to the backup path for forwarding. The RT2 may switch the packet to the backup path for forwarding in a form of an existing context table, or certainly in the foregoing manner of configuring the context table. This is not limited herein. For a specific sending process, refer to the forwarding manner in the embodiment corresponding to FIG. 4. Details are not described herein again.

In addition, when the stitching node is faulty, the previous-hop node switches the packet to the backup path for forwarding. After the stitching node is recovered and restarted, the stitching node floods information such as a node (prefix) label and an adjacency label of the stitching node to another node on the network again. After receiving the information flooded by the stitching node, the previous-hop node switches the data packet back to the primary path, in other words, transmits the packet through the stitching node again. However, because the stitching node is just restarted, the stitching node may have an incomplete local database, for example, has not learned of information about other nodes, such as a node label and an adjacency label of the next-hop node of the stitching node on the primary path. In this case, after receiving the packet, the RT3 cannot forward the packet to the next hop node, resulting in a packet loss.

As shown in FIG. 5, the RT1 specifies the SR-TE path: RT3→RT4→RT5. When the RT3 is faulty, the RT2 triggers SR-TE FRR switching after detecting that the RT3 is faulty, and switches to the backup path: RT7→RT4→RT5. Therefore, the faulty node RT3 is bypassed. After the RT3 recovers and restarts, the RT3 re-advertises the node SID across the entire network, and the RT2 switches the data packet back to the RT3. However, because the RT3 is just restarted, the RT3 may have an incomplete local database. For example, the RT3 has not learned of node SIDs of the RT4 and the RT5. As a result, the data packet cannot be forwarded from the RT3 to the next-hop node RT4 and is discarded.

Based on this, this embodiment of this application provides the transmission path fault processing method. After the stitching node is restored and restarted, the previous-hop node of the restored stitching node does not learn of prefix SIDs of other nodes when detecting that the stitching node is restored, resulting in a data packet loss. After the stitching node is recovered, the stitching node first advertises indication information across the entire network, and the indication information is used to indicate that the recovered stitching node cannot correctly forward a packet. Therefore, when receiving the data packet to be sent to the restored stitching node, the previous-hop node still forwards the data packet through the backup path.

For example, the indication information may be carried in an overload bit. The overload bit is defined in the IS-IS routing protocol. If a node cannot complete all link state databases (LSDB), namely, topology information of all nodes on the entire network that is stored in the node, the node uses a bit in a header of a link state data packet advertised by the node to identify an LSDB that the node does not complete. Consequently, a packet cannot be correctly forwarded, a flag of this bit is called an overload (OL) bit. Another node learns, by using an overload bit in a link state packet advertised by the stitching node, that the stitching node may not make a correct routing decision, in other words, cannot correctly forward the data packet. This is because that the stitching node does not complete LSDBs of the stitching node. The another node does not forward the data packet through the stitching node when calculating a shortest path.

The network architecture shown in FIG. 5 is used as an example. After the stitching node RT3 is recovered from a fault and is restarted, to prevent a data packet loss caused because the RT2 detects, before the RT3 learns of the prefix SIDs of the RT4 and the RT5, that the RT3 is recovered from a fault. After being restarted from a fault, the RT3 adds an overload bit flag to a header of a link state packet.

The RT2 receives the overload bit in the link state packet advertised by the RT3 and detects that the next-hop node RT3 is in an overload state. The overload state indicates that the restored stitching node cannot correctly forward a packet. Therefore, the node RT2 continues to use the SR-TE FRR forwarding path used before the fault recovery, and the RT2 may forward the data packet by using the backup path in a form of an existing context table, or certainly, in the foregoing manner of configuring a context table. This is not limited herein.

A time period taken by the stitching node to complete the LSDB, namely, the overload time, is generally long, for example, 60 s. Therefore, within the duration, the RT2 may forward the data packet along the SR-TE FRR path (backup path) by looking up the context table. For example, the overload duration may be configured, and the RT2 forwards the data packet along the backup path within the duration. When completing the LSDBs, the RT3 can advertise the link state packet again across the entire network, and the header does not contain the overload bit flag. After receiving the link state data packet that does not include the overload bit flag, the RT2 switches the data packet back to the RT3 for forwarding.

Figure 8:
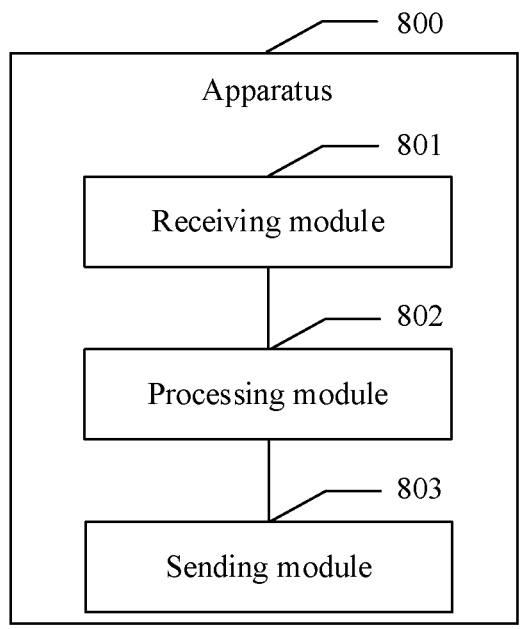
FIG. 8 is a schematic structural diagram of an apparatus 800 according to an embodiment of this application.

Based on a same inventive concept as the method embodiment, an embodiment of this application further provides an apparatus. Referring to FIG. 8, the apparatus 800 is applied to a network device. The apparatus 800 may include a receiving module 801, a processing module 802, and a sending module 803. The apparatus 800 may be specifically a processor, a chip, a chip system, a function module, or the like in the network device. The processing module 802 is configured to control and manage an action of the apparatus 800. The receiving module 801 is configured to receive information or a packet. The sending module 803 is configured to send information or a packet. The processing module 802 is configured to process the information or the packet received by the receiving module 801. The processing module 802 may be further configured to indicate a processing process related to the network device (for example, the first node, the RT2, the stitching node, or the RT3) in any one of the foregoing embodiments and/or another process of the technical solution described in this application. The apparatus may further include a storage module (not shown in FIG. 8). The storage module is configured to store a context table and primary and backup forwarding tables.

In an embodiment, the apparatus 800 may be applied to a previous-hop node of a stitching node, such as the first node in the embodiment corresponding to FIG. 2 or the RT2 in the embodiments corresponding to FIG. 3 and FIG. 5.

For example, the apparatus 800 is applied to the first node. The receiving module 801 is configured to receive a stitching label and a stitching label stack list corresponding to the stitching label that are sent by a stitching node.

The processing module 802 is configured to determine, in a process of sending a packet through a primary path, that the stitching node is faulty, where the packet includes a label stack list used to guide packet forwarding on the primary path, and the stitching node is a next-hop node of the first node on the primary path.

The processing module 802 is further configured to replace the stitching label in the label stack list with the stitching label stack list.

The sending module 803 is configured to switch, based on a label stack list obtained after updating by the processing module 802, the packet to a backup path for sending.

Optionally, the processing module 802 is further configured to: after the receiving module 801 receives the stitching label and the stitching label stack list corresponding to the stitching label that are sent by the stitching node, store the stitching label and the corresponding stitching label stack list in a label information table generated by the first node for the stitching node.

The processing module 802 is specifically configured to: when replacing the stitching label in the label stack list with the stitching label stack list, obtain a first label from a stack top of the label stack list, where the first label is used to indicate that a next-hop node forwarding the packet is the stitching node; determine, based on a backup forwarding table, a first forwarding action corresponding to the first label, wherein the backup forwarding table is used to indicate the backup path, and the first forwarding action is used to indicate to look up the label information table; determine, based on the label information table, a second label located at the stack top of the stitching label stack list, wherein the second label is used to indicate that the next-hop node of the stitching node on the primary path is a third node; and use the second label as an inner label, and determine, from the backup forwarding table, an outer label of a backup path from the first node to the third node.

The sending module 803 is specifically configured to send the packet to a next-hop node of the first node on the backup path based on the outer label.

Optionally, the sending module 803 is further configured to: after the receiving module 801 receives a node segment identifier of the third node that is flooded by the stitching node across a network, flood the node segment identifier of the third node to another node on the network.

Optionally, the receiving module 801 is further configured to: when the sending module 803 sends the packet through the backup path, receive indication information sent by the stitching node after fault recovery, where the indication information is used to indicate that the stitching node cannot correctly forward the packet, and the sending module 803 is further configured to continue to send the packet through the backup path.

Optionally, the apparatus 800 may be applied to a stitching node, such as the stitching node in the embodiment corresponding to FIG. 2 or the RT3 in the embodiments corresponding to FIG. 3 and FIG. 5.

For example, the apparatus 800 is applied to the stitching node. The receiving module 801 is configured to receive a stitching label and a stitching label stack list corresponding to the stitching label that are sent by a controller. The sending module 803 is configured to flood the stitching label and the stitching label stack list corresponding to the stitching label to another network device on a network. Optionally, the processing module 802 is configured to store the stitching label and the stitching label stack list corresponding to the stitching label in a storage module (not shown in FIG. 8).

Figure 9:
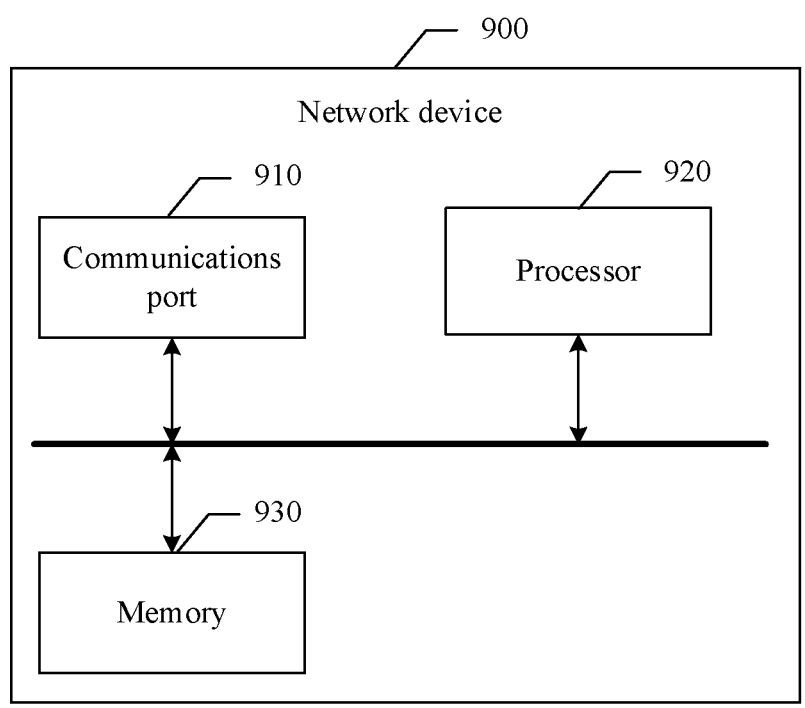
FIG. 9 is a schematic structural diagram of a network device 900 according to an embodiment of this application.

An embodiment of this application further provides a structure of a network device. As shown in FIG. 9, a network device 900 may include a communications interface 910 and a processor 920. Optionally, the network device 900 may further include a memory 930. The memory 930 may be disposed inside the network device, or may be disposed outside the network device. The processing module 802 shown in FIG. 8 may be implemented by the processor 920. The receiving module 801 and the sending module 803 may be implemented by the communications interface 910.

Optionally, the processor 920 receives and sends a packet or a message through the communications interface 910, and is configured to implement any method performed by a node (the first node or the RT2) in FIG. 2 to FIG. 8. In an implementation process, operations in the processing procedure may be implemented by using an integrated logic circuit of hardware or an instruction in a form of software in the processor 920, to complete the method performed by the first node or the RT2 in FIG. 2 to FIG. 5. For brevity, details are not described herein again. Program code executed by the processor 920 to implement the foregoing method may be stored in the memory 930. The memory 930 is coupled to the processor 920.

Optionally, the processor 920 receives and sends a packet or a message through the communications interface 910, and is configured to implement any method performed by a node (the stitching node or the RT3) in FIG. 2 to FIG. 5. In an implementation process, operations in the processing procedure may be implemented by using an integrated logic circuit of hardware or an instruction in a form of software in the processor 920, to complete the method performed by the stitching node or the RT3 in FIG. 2 to FIG. 5. For brevity, details are not described herein again. Program code executed by the processor 920 to implement the foregoing method may be stored in the memory 930. The memory 930 is coupled to the processor 920.

Any communications interface in the embodiments of this application may be a circuit, a bus, a transceiver, or any other apparatus that may be configured to exchange information, for example, the communications interface 910 in the network device 900. For example, the another apparatus may be a device connected to the network device 900. For example, the another apparatus may be a previous-hop node, a next-hop node, or the like of the network device 900.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general purpose processor may be a microprocessor or any conventional processor or the like. The operations of the method disclosed with reference to the embodiments of this application may be directly performed by a hardware processor, or may be performed by using a combination of hardware in the processor and a software module.

Couplings in the embodiments of this application are indirect couplings or communication connections between apparatuses, modules, or modules, may be electrical, mechanical, or another form, and are used for information interaction between the apparatuses, the modules, and the modules.

The processor 920 may operate with the memory 930 together. The memory 930 may be a nonvolatile memory, for example, a hard disk drive (HDD) or a solid-state drive (SSD), or may be a volatile memory, for example, a random-access memory (RAM). The memory 930 is any other medium that can carry or store expected program code in a form of an instruction or a data structure and that can be accessed by a computer, but is not limited thereto.

In this embodiment of this application, a specific connection medium between the communications interface 910, the processor 920, and the memory 930 is not limited. In this embodiment of this application, the memory 930, the processor 920, and the communications interface 910 are connected by using a bus 940 in FIG. 9, and the bus is represented by a bold line in FIG. 9. A manner of connection between other components is schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

Based on the foregoing embodiments, an embodiment of this application further provides a computer storage medium. The storage medium stores a software program, and when read and executed by one or more processors, the software program may implement the method provided in any one or more of the foregoing embodiments. The computer storage medium may include: any medium that can store program code, such as a removable hard disk, a read-only memory, a random access memory, a magnetic disk, or an optical disc.

Based on the foregoing embodiments, an embodiment of this application further provides a chip. The chip includes a processor, configured to implement functions in any one or more of the foregoing embodiments, for example, configured to implement the methods performed by the first node or the RT2 in FIG. 2 to FIG. 5, or configured to implement the methods performed by the stitching node or the RT3 in FIG. 2 to FIG. 5. Optionally, the chip further includes a memory. The memory is configured to store a program instruction and data that are necessary and executed by the processor. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A transmission path fault processing method, comprising:
   receiving, by a first network device, a stitching label and a stitching label stack list corresponding to the stitching label that are sent by a stitching network device;
   determining, by the first network device in a process of sending a packet through a primary path, that the stitching network device is faulty, the packet comprising a label stack list used to guide packet forwarding on the primary path, and the stitching network device being a next-hop network device of the first network device on the primary path; and replacing, by the first network device, the stitching label in the label stack list with the stitching label stack list, and switching, based on the updated label stack list, the packet to a backup path for sending.

2. The method according to claim 1, wherein after the receiving, by a first network device, of the stitching label and the stitching label stack list corresponding to the stitching label that are sent by a stitching network device, the method further comprises:

storing, by the first network device, the stitching label and the corresponding stitching label stack list in a label information table generated by the first network device for the stitching network device; and wherein the replacing, by the first network device, of the stitching label in the label stack list with the stitching label stack list, and switching the packet to a backup path for sending comprises:

obtaining, by the first network device, a first label from a stack top of the label stack list, the first label used to indicate that a next-hop network device forwarding the packet is the stitching network device;

determining, by the first network device based on a backup forwarding table, a first forwarding action corresponding to the first label, the backup forwarding table used to indicate the backup path, and the first forwarding action is used to indicate to look up the label information table;

determining, by the first network device based on the label information table, a second label located at the stack top of the stitching label stack list, the second label used to indicate that a next-hop network device of the stitching network device on the primary path is a third network device;

using, by the first network device, the second label as an inner label, and determining, from the backup forwarding table, an outer label of a backup path from the first network device to the third network device; and sending, by the first network device, the packet to a next-hop network device of the first network device on the backup path based on the outer label.

3. The method according to claim 1, wherein the receiving, by a first network device, of the stitching label and the stitching label stack list corresponding to the stitching label that are sent by a stitching network device comprises:

receiving, by the first network device, a type length value (TLV) sent by the stitching network device, the TLV comprising the stitching label and the stitching label stack list corresponding to the stitching label.

4. The method according to claim 3, wherein the TLV is a label binding SID or a label binding TLV.

5. The method according to claim 1, further comprising:

after receiving a node segment identifier of a third network device flooded by the stitching network device across a network, flooding, by the first network device, the node segment identifier of the third network device to another network device on the network.

6. The method according to claim 1, further comprising:

when the first network device sends the packet through the backup path, receiving, by the first network device, indication information sent by the stitching network device after fault recovery, the indication information used to indicate that the stitching network device is unable to correctly forward the packet, and continuing, by the first network device, to send the packet through the backup path.

7. A network device operating as a first network device, comprising:

a communications interface;

a processor; and a memory;

wherein the memory is configured to store a software program, which, when executed by the processor, causes the processor to perform operations, the operations comprising:

receiving, at the communication interface, a stitching label and a stitching label stack list corresponding to the stitching label that are sent by a stitching network device, determining, in a process of sending a packet through a primary path, that the stitching network device is faulty, the packet comprising a label stack list used to guide packet forwarding on the primary path, and the stitching network device being a next-hop network device of the first network device on the primary path, and replacing, the stitching label in the label stack list with the stitching label stack list, and switch, based on the updated label stack list, the packet to a backup path for sending.

8. The network device according to claim 7, wherein after the receiving, the stitching label and the stitching label stack list corresponding to the stitching label that are sent by a stitching network device, the operations further comprise:

storing the stitching label and the corresponding stitching label stack list in a label information table generated by the first network device for the stitching network device; and wherein the replacing, the stitching label in the label stack list with the stitching label stack list, and switching the packet to a backup path for sending comprises:

obtaining, by the first network device, a first label from a stack top of the label stack list, the first label used to indicate that a next-hop network device forwarding the packet is the stitching network device;

determining, by the first network device based on a backup forwarding table, a first forwarding action corresponding to the first label, the backup forwarding table used to indicate the backup path, and the first forwarding action used to indicate to look up the label information table;

determining, based on the label information table, a second label located at the stack top of the stitching label stack list, the second label used to indicate that a next-hop network device of the stitching network device on the primary path is a third network device;

using, the second label as an inner label, and determining, from the backup forwarding table, an outer label of a backup path from the first network device to the third network device; and wherein the communications interface is configured to send, the packet to a next-hop network device of the first network device on the backup path based on the outer label.

9. The network device according to claim 7, wherein the operations further comprise:

receiving, a type length value (TLV) sent by the stitching network device, the TLV comprising the stitching label and the stitching label stack list corresponding to the stitching label.

10. The network device according to claim 9, wherein the TLV is a label binding SID or a label binding TLV.

11. The network device according to claim 7, wherein the operations further comprise:

flooding, a node segment identifier of a third network device to another network device on the network.

12. The network device according to claim 7, wherein the operations further comprise:

receiving indication information sent by the stitching network device after fault recovery, the indication information used to indicate that the stitching network device is unable to correctly forward the packet, and continuing, to send the packet through the backup path.

13. A network device, comprising:

a communications interface;

a processor; and a memory;

wherein the memory is configured to store a software program, which, when executed by the processor, causes the processor to perform operations, the operations comprising:

receiving, at the communication interface, a stitching label and a stitching label stack list corresponding to the stitching label that are sent by a controller, and flooding, by the network device to another network device on a network, the stitching label and the stitching label stack list corresponding to the stitching label.

\* \* \* \* \*